(12) United States Patent
Eichinger et al.

(10) Patent No.: US 10,456,718 B2
(45) Date of Patent: Oct. 29, 2019

(54) FILTER ELEMENT AND FILTER SYSTEM FOR A LIQUID MEDIUM, IN PARTICULAR DIESEL FUEL

(71) Applicant: MANN+HUMMEL GMBH, Ludwigsburg (DE)

(72) Inventors: Stefan Eichinger, Gerlingen (DE); Martin Veit, Gaertringen (DE); Arndt-Udo Rolle, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 204 days.

(21) Appl. No.: 14/513,329

(22) Filed: Oct. 14, 2014

(65) Prior Publication Data

US 2015/0101975 A1    Apr. 16, 2015

(30) Foreign Application Priority Data

Oct. 14, 2013    (DE) .................. 10 2013 016 976

(51) Int. Cl.
| | | |
|---|---|---|
| *B01D 35/00* | (2006.01) | |
| *B01D 29/15* | (2006.01) | |
| *B01D 29/21* | (2006.01) | |
| *B01D 29/58* | (2006.01) | |
| *B01D 36/00* | (2006.01) | |

(52) U.S. Cl.
CPC .......... *B01D 35/005* (2013.01); *B01D 29/15* (2013.01); *B01D 29/21* (2013.01); *B01D 29/58* (2013.01); *B01D 36/003* (2013.01); *B01D 2201/295* (2013.01); *B01D 2201/4084* (2013.01)

(58) Field of Classification Search
None
See application file for complete search history.

(56) References Cited

U.S. PATENT DOCUMENTS

| | | | | |
|---|---|---|---|---|
| 3,187,895 | A * | 6/1965 | Pall .................... | B01D 17/0214 210/114 |
| 3,262,572 | A * | 7/1966 | Cook ................... | B01D 17/045 210/307 |
| 2008/0272046 | A1 | 11/2008 | Lampert et al. | |

(Continued)

FOREIGN PATENT DOCUMENTS

| | | |
|---|---|---|
| DE | 102009058812 A1 | 6/2011 |
| EP | 1932574 A1 | 6/2008 |

*Primary Examiner* — Benjamin M Kurtz
(74) *Attorney, Agent, or Firm* — James Hasselbeck

(57) ABSTRACT

A filter element arranged in a filter housing is provided with an annular filter medium flowed through by a liquid medium in a flow direction radial to a longitudinal axis of the filter element. A clean chamber is arranged in the flow direction of the liquid medium downstream of the filter medium. A filtered liquid medium outlet is fluidically connected to the clean chamber. A cylinder-shaped water separating screen is arranged in the clean chamber to separate water contained in the liquid medium. A water outlet opening fluidically connects the clean chamber to a water collecting chamber of the filter housing. A particle filter is arranged at the water outlet opening or arranged between the water outlet opening and the filtered liquid medium outlet of the filter element. The water outlet opening of the filter element is fluidically connected with the water collecting chamber of the filter housing.

3 Claims, 2 Drawing Sheets

(56) References Cited

U.S. PATENT DOCUMENTS

2010/0219117 A1\* 9/2010 Reiland ................. B01D 27/08
210/256
2011/0000833 A1 1/2011 Eberle et al.
2011/0168621 A1\* 7/2011 Wieczorek ........... B01D 17/045
210/487
2012/0318728 A1 12/2012 Eberle et al.

\* cited by examiner

FILTER ELEMENT AND FILTER SYSTEM FOR A LIQUID MEDIUM, IN PARTICULAR DIESEL FUEL

CROSS-REFERENCE TO RELATED APPLICATION

This application claims a priority date of Oct. 14, 2013, based on prior filed German patent application No. 10 2013 016 976.3, the entire contents of the aforesaid German patent application being incorporated herein by reference.

BACKGROUND OF THE INVENTION

The invention concerns a filter element for a liquid medium, in particular diesel fuel, that comprises an annularly arranged filter medium that can be flowed through by the liquid medium in a flow direction radial to a longitudinal axis of the filter element; a clean chamber which is arranged in flow direction downstream of the filter medium and which is fluidically connected with an outlet of the filter element for the filtered liquid medium; a cylinder-shaped water separating screen arranged in the clean chamber for separating water contained in the liquid medium; and a water outlet opening by means of which the clean chamber can be fluidically connected to a water collecting chamber of a filter housing. The invention also concerns a filter system with such a filter element.

DE 10 2009 058 812 A1 discloses a fuel filter system with a filter housing and with a filter element arranged in the filter housing in which the filter element comprises an annularly arranged filter medium that can be flowed through by the fuel in a flow direction which is radial to the longitudinal axis of the filter element. The filter element has a clean chamber that is arranged in the interior of the filter element in the flow direction downstream of the filter element. The clean chamber is connected with an outlet of the filter element for the filtered liquid medium. A water separating device with a water separating screen and with a coalescing element which is arranged upstream of the water separating screen in the flow direction serves for separating water from the fuel that is being passed through the filter medium. The clean chamber is fluidically connected by means of a water outlet opening with a water collecting chamber of the filter housing arranged at the bottom.

When exchanging an aforementioned filter element, it must be removed from the filter housing. In this context, contaminants, which during operational use of the filter element have been retained on the exterior of the filter medium and optionally adhere externally to the filter medium, or unfiltered liquid medium may penetrate into the water collecting chamber of the filter housing. The contaminants contained in the water collecting chamber, in particular particles, may be entrained through the water outlet opening (retrograde) into the clean chamber of the filter element after an exchange of the filter element because the clean chamber, in operation of the filter system, is fluidically connected with the separating chamber of the filter element. Such contaminants may cause damage on a machine operated with the liquid medium, for example, an internal combustion engine.

SUMMARY OF THE INVENTION

It is the object of the invention to provide a filter element of the aforementioned kind and a filter system with such a filter element with which the disadvantages of the prior art can be overcome.

The object concerning the filter element is solved for the filter element in that a particle filter is arranged in the area of the water outlet opening or between the water outlet opening and the filtered liquid medium outlet of the filter element. The object concerning the filter system is solved in that the filter system comprises a filter housing with a water collecting chamber and a filter element according to the invention as disclosed herein that is arranged in the filter housing, wherein the water outlet opening of the filter element is fluidically connected with the water collecting chamber of the filter housing.

The filter element is provided in accordance with the invention with a particle filter which is arranged in the area of the water outlet opening or between the water outlet opening and the filter liquid medium outlet of the filter element.

The filter element according to the invention ensures, on the one hand, a reliable separation of water contained in the liquid medium from the liquid medium, as is required in connection with fuels for reliable operation of an internal combustion engine. On the other hand, in case of an exchangeable use of the filter element that in practice is required frequently, an undesirable contamination of the liquid medium which is discharged from the filter element, in particular diesel fuel, by contaminants that are contained in the water collecting chamber of the filter housing can be prevented. This is advantageous for an interruption-free operation as well as long service life of machines or component groups operated with the liquid medium. Cleaning of the water collecting chamber which in practice is required in particular in case of critical applications is therefore obsolete in most cases.

In the first case, an undesirable introduction of contaminants into the clean chamber of the filter element as a whole can be prevented. In this embodiment, there is however in principle the risk that the discharge of the water separated at the side of the clean chamber is impaired by excessive clogging of the particle filter with retained contaminants.

In the latter case, with respect to considerations regarding manufacturing technology as well as functional considerations, it has been found to be advantageous when the particle filter is arranged within the water separating screen. The particle filter can be inserted accordingly upon assembly in a simple way into the water separating screen. Retrofitting of existing filter elements is possible. Moreover, in this way a large (active) filter surface can be made available. Even a higher-level dirt introduction into the clean chamber of the filter element can therefore be filtered out without problems from the liquid medium. It is understood that the particle filter must be coupled at the rim on components of the filter element such that the liquid medium with the contaminants contained therein is completely guided, i.e., without bypassing the particle filter, through the particle filter. Also, the particle filter in this variant preferably can form an additional particle filtration stage relative to the (main) filter medium. In particular, for this purpose it has a higher filter fineness than the upstream (main) filter medium, i.e., small particles that can pass through the (main) filter medium are retained on the particle filter.

The active filter surface of the particle filter in accordance with the invention can be further enlarged in that the particle filter is embodied as a star-shape folded bellows. In this way, moreover a high degree of bending stiffness of the particle filter can be achieved which is advantageous with regard to its assembly and operating function.

A particularly robust mechanical configuration of the filter element can be achieved according to the invention in that the particle filter at the inner side is resting on a central tube. In this way, the particle filter can be protected reliably against collapse or damage, even in case of high pressure loading by the liquid medium as well as in case of flow resistance possibly increased due to contaminants. The particle filter, for easier installation of the filter element, can be attached in particular on the screen element and/or on the central tube and can form therewith an assembly unit.

In case of the particle filter arranged in the area of the water outlet opening, the particle filter is advantageously arranged externally at a bottom end plate of the filter element. The particle filter can overlap the water outlet opening in particular in axial direction. Accordingly, a particularly simple assembly of the particle filter is made possible.

With regard to considerations relating to manufacturing technology, it has been found to be advantageous in this context when the particle filter is arranged, attached by means of an annular securing device, on the end plate, the securing device screwed or snapped onto the end plate. The end plate is for this purpose preferably monolithically embodied with a suitable thread or with a suitable locking device for the securing device.

The particle filter can be embodied in particular of fibers, in particular cellulose fibers, or may comprise them. Also, other fibers, for example, made from polyolefin, are conceivable. The fibers can be, as needed, hydrophilic and/or hydrophilically finished in order to discharge in a simplified way the water molecules or water droplets through the particle filter from the separating chamber.

The fibers of the particle filter according to the invention have preferably a unidirectional or substantially unidirectional fiber extension. Accordingly, discharge of water that has been separated from the liquid medium out of the clean chamber can be further improved.

The filter element may comprise a coalescing element that is arranged at a spacing upstream of the water separating screen. The coalescing element is preferably arranged in the clean chamber adjacent to the filter medium. The coalescing element can be formed of fibers or may comprise fibers. In this way, a particularly effective water separation is enabled from the liquid medium to be filtered.

The filter system according to the invention comprises a filter housing and a filter element arranged in the filter housing in the way described above. The water outlet opening of the filter element or of the clean chamber is fluidically connected with the water collecting space of the filter housing arranged at the bottom. With the filter system according to the invention, a liquid medium with reduced water and particle contents can be provided at any time. This is in particular advantageous in critical application situations.

Cleaning of the collecting chamber, which is often time-consuming and complex in practice, is thus obsolete before insertion of the filter element.

The filter element as well as the filter system are suitable for many technical fields of use, for example, fuel processing for internal combustion engines with or without injection systems or filtration of lubricant agents such as transmission oil or hydraulic oil.

BRIEF DESCRIPTION OF THE DRAWINGS

Further advantages and expedient embodiments can be taken from the additional claims, the figure description, and the drawing.

DESCRIPTION OF PREFERRED EMBODIMENTS

Figure 1:
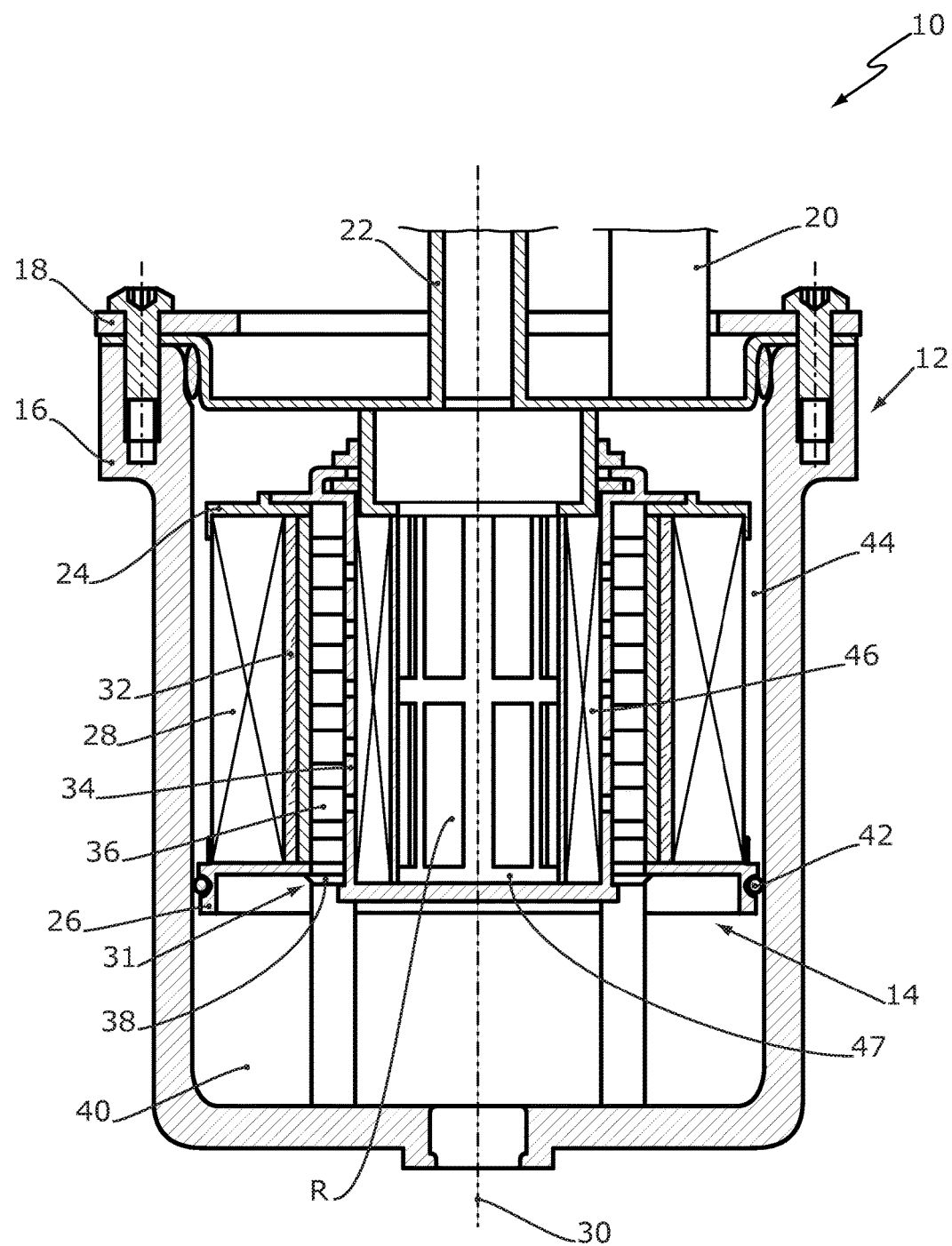
FIG. 1 shows a fuel filter system in a section illustration, comprising a filter housing and a filter element arranged therein, wherein the filter element comprises a separating device, with an outlet opening for fluid separation products, as well as a particle filter, by means of which particulate contaminants that have been entrained through the outlet opening into the filter element, can be filtered out of the fuel.

In FIG. 1, a filter system 10 with a filter housing 12 and a filter element 14 arranged therein for a liquid medium, in particular for a fuel or lubricant medium, is shown.

The filter housing 12 has a housing container 16 which is closed off by a housing cover 18 that is detachably arranged at the housing container 16. On the housing cover 18, a fuel supply 20 for the fuel to be filtered and a filtered liquid medium outlet 22 in the form of a fuel discharge for the fuel filter 10 filtered in the filter system 10 are attached.

The filter element 14 has a substantially cylindrical cross-section. Between an upper end plate 24 and a lower end plate 26 of the filter element 14 an annularly closed star-shape folded filter medium 28 is arranged.

The filter medium 28 in operation of the filter system 10 is flowed through from the exterior to the interior by the fuel to be filtered in a flow direction that is radial to the longitudinal axis 30 of the filter element 14.

In the flow direction downstream of the filter element 28, a separating device 31 for separating contaminants, here water, contained in the fuel is arranged.

The separating device 31 comprises in the present case a coalescing element 32 and a water separating screen 34 which are arranged in flow direction behind each other. Between the coalescing element 32 and the screen-shaped water separating element 34 a separating chamber 36 is formed. The separating chamber 36 serves for gravitational deposition of a separation product separated from the fuel, here in particular water molecules or water droplets. The separating chamber 36 has a water outlet opening 38 for the separation product which is delimited by the bottom end plate 26 of the filter element 14. In operation of the filter system 10, the separation products move, following the force of gravity, in downward direction toward and through the water outlet opening 38 into the water collecting chamber 40 of the filter housing 12 arranged at the bottom.

The water collecting chamber 40 is connected by water outlet opening 38 with the separating chamber 36.

As can be seen in FIG. 1, the filter element 14 has at the circumference a circumferentially extending rubber-elastic sealing element 42 which is seal-tightly positioned at the inner wall on the housing container 16. The sealing element 42 separates seal-tightly a fuel supply slot 44 at the inlet side, i.e., in the flow direction upstream of the filter medium 28, with unfiltered and therefore potentially contaminated fuel, relative to the water collecting chamber 40 of the filter housing 12.

Upon exchange of the filter element 14, contaminants adhering on the exterior on the filter medium 28 and also contaminated fuel may be introduced into the water collecting chamber 40 of the filter housing 12. Contaminants contained In the water collecting chamber 40, in particular particles, can be entrained after exchange of the filter element 14 through the water outlet opening 38 (retrograde) into the separating chamber 36 of the filter system 10 because the water collecting chamber 40 is fluidically connected with the separating chamber 36.

The filter element illustrated in FIG. 1 has therefore a particle filter 46 which is arranged within the filter element 14 in order to separate the contaminants or particles, which have been entrained from the water collecting chamber 40 into the separating chamber 36, from the fuel before the fuel is discharged from the filter system 10 through the outlet 22. The particle filter 46 is thus arranged downstream of the water separating element 34 in flow direction of the fluid medium.

The particle filter 46 in the present case is designed as an annularly closed star-shape folded bellows and, for example, can be seal-tightly resting by means of sealing parts, connected by injection molding to the ends, at the end plates 24, 26 of the filter element 14 or in radial direction at the water separating element 34. For supporting the particle filter 46, the particle filter 46 is resting with its radial inner side on a central tube 47.

Considered fluidically, downstream of the particle filter 46 a clean chamber R of the filter system 10 is provided.

The particle filter 46 is comprised preferably of a hydrophilic fiber material and has in comparison to the filter medium 28 a greater pore size. The pore size of the particle filter 46 can be in particular between 50 micrometers and 200 micrometers. As seen in FIG. 1, the particle filter 46 and central tube 47, for easier installation in the filter element 14, can be attached in particular on the screen element 34. The screen element 34 is a cylinder-shaped water separating screen having (see FIG. 1), a closed bottom (closed bottom of 34, FIG. 1), and a radially outwardly extending flange (see flange on upper axial end of 34, FIG. 1). The particle filter 46 is arranged on a radially inner face of the screen element 34, the particle filter is attached to the screen element 34 and resting on the closed bottom (see particle 46 on closed bottom, FIG. 1). The central tube 47 is arranged within a radial interior of the particle filter 46, resting on a radially inner face of the particle filter 46 (FIG. 1), the central tube extends from a lower axial end of the particle filter 46 on the closed bottom (see FIG. 1) up to an upper axial end of the particle filter 46 such that the central tube 47 to support the particle filter over its axial length. The particle filter 46 has a radially outer side that is arranged on the screen element 34 (FIG. 1) such that the particle filter 46 is sandwiched between the central tube 47 and the screen element 34. The radially outwardly extending flange (radially outwardly extending flange on upper axial end of 34, FIG. 1) rests directly on and is sealed tightly to an axially outer face of the upper end plate 24.

Figure 2:
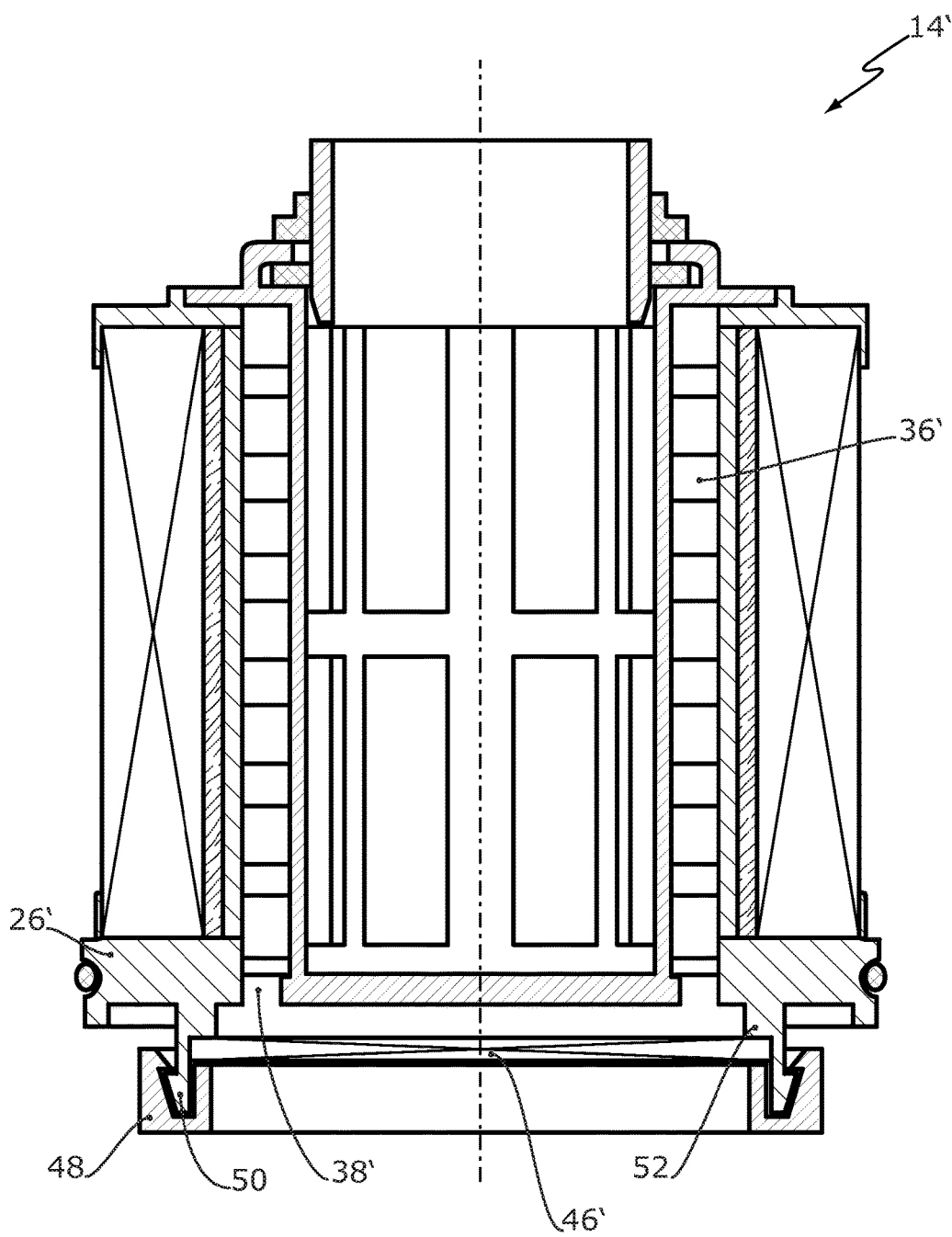
FIG. 2 shows a filter element similar to the filter element of FIG. 1 in which the particle filter in the area of the outlet opening of the separating device is arranged externally on an end plate of the filter element.

FIG. 2 shows a filter element 14' which differs from the filter element 14 illustrated in FIG. 1 substantially in that the particle filter 46' in the area of the water outlet opening 38' of the separating chamber 36' is arranged externally on the bottom end plate 26' of the filter element 14'. The particle filter 46' is embodied disk-shaped. The water outlet opening 38' of the separating chamber 36' is completely overlapped by the particle filter 46' in axial direction. For attachment of the particle filter 46' an annular securing device 48 is provided which is locked with a locking element 50 on the bottom end plate 26'. The locking element 50 is integrally formed on the bottom end plate 26', i.e., monolithically formed with the bottom end plate 26'. The particle filter 46' is positioned in the herein illustrated embodiment on an annular shoulder 52 of the locking element 50 and is thereby arranged at a spacing away from the water outlet opening 38' of the separating chamber 36'.

The particle filters 46, 46' comprise hydrophilic fibers, for example, cellulose fibers, in order to ensure a reliable discharge of the water molecules or water droplets, separated within the separating chamber 36, 36', into the water collecting chamber 40. The fibers can be in particular microfibers. The fibers can have in this context a unidirectional or substantially unidirectional fiber extension in order to improve the discharge of the separation products from the separating chamber 36, 36' into the water collecting chamber 40.

It is understood that the filter system illustrated in FIG. 1 or the filter elements illustrated in FIGS. 1 and 2 can also be used for other application purposes, for example, for purifying transmission oil or lubricant oil.

In summarizing the above, the invention concerns a filter element for purifying a liquid medium. The filter element is insertable into a filter housing of a filter system and has a filter medium. First a water separating screen and then a clean chamber are fluidically arranged downstream of the filter medium. The water that is bouncing off the water separating screen flows through a water outlet opening into a water collecting chamber of the filter housing. The water collecting chamber is therefore fluidically connected with the clean chamber. When exchanging the filter element, dirt particles can reach the water collecting chamber. In order to avoid transfer of these dirt particles from the water collecting chamber into the clean chamber, a particle filter is arranged between the water collecting chamber and the clean chamber. The invention concerns moreover a filter system with a filter element as described above.

While specific embodiments of the invention have been shown and described in detail to illustrate the inventive principles, it will be understood that the invention may be embodied otherwise without departing from such principles.

What is claimed is:

1. A filter element for a liquid medium, the filter element comprising:
    an annular filter medium having an upper end plate and a lower end plate, the annular filter medium configured to be flowed through by a liquid medium in a flow direction radial to a longitudinal axis of the filter element;
    a coalescing medium arranged on a radially inner side of the annular filter medium;
    an assembly unit comprising:
        a screen element as a cylinder-shaped water separating screen having a closed bottom, an upper axial end of the cylinder-shaped water separating screen forming a radially outwardly extending flange, the cylinder-shaped water separating screen adapted to separate water contained in the liquid medium from the liquid medium;
        wherein radially the outwardly extending flange is adapted to connect to a housing cover of a filter system;
        a particle filter of a hydrophilic fiber material and having a greater pore size than the annular filter medium of the filter element, the particle filter adapted to be arranged at a lower end of a cup-shaped outlet member of the filter system, the particle filter is star-folded and arranged on a radially inner face of the screen element, the particle filter attached to the screen element and resting on the closed bottom of the screen element;

a central tube arranged within a radial interior of the particle filter, resting directly on a radially inner face of the particle filter, the central tube extending from a lower axial end of the particle filter on the closed bottom up to an upper axial end of the particle filter such that the central tube supports the particle filter over its axial length;

wherein the particle filter has a radially outer side that is arranged on the screen element such that the particle filter is sandwiched between the central tube and the screen element;

wherein the radially outwardly extending flange of the cylinder-shaped water separating screen rests directly on an axially outer face of the upper end plate;

a clean chamber arranged at the radially inner side of the central tube, and closed at a lower end of the clean chamber by the closed bottom, the clean chamber arranged in the flow direction of the liquid medium downstream of the filter medium and downstream of the particle filter; and wherein the assembly unit is configured for installation as a unit into an interior of the annular filter medium;

a separating chamber arranged between the coalescing element and a radially outer side of the assembly unit and having a water outlet opening fluidically connecting the separating chamber to a water collecting chamber of a filter housing configured to receive the filter element;

a filtered liquid medium outlet fluidically connected to the clean chamber.

2. The filter element according to claim 1, further comprising a coalescing element arranged upstream of the water separating screen in the flow direction of the liquid medium, wherein the coalescing element is arranged at a spacing away from the water separating screen.

3. A filter system comprising:

a filter housing with a water collecting chamber;

a filter element arranged in an interior chamber of the filter housing, the filter element comprising:

an annular filter medium having an upper end plate and a lower end plate, the annular filter medium configured to be flowed through by a liquid medium in a flow direction radial to a longitudinal axis of the filter element;

a coalescing medium arranged on a radially inner side of the annular filter medium;

a filter housing cover configured to install onto the filter housing to close off the interior chamber of the filter housing, the filter housing cover having:

an filtered liquid medium outlet;

wherein the filter housing cover is arranged spaced axially away from the filter element; and a cup-shaped outlet member formed on an interior side of the filter housing cover and in communication with the filtered liquid medium outlet, the cup shaped outlet member having an upper end arranged on the filter housing cover extending axially downwardly from the filter housing cover to a lower end of the cup shaped outlet member;

an assembly unit comprising:

a screen element configured as a cylinder-shaped water separating screen having a closed bottom, an upper axial end of the cylinder-shaped water separating screen forming a radially outwardly extending flange, the radially outwardly extending flange secured onto the cup-shaped outlet member and spaced axially away from the interior side of the filter housing cover;

wherein the cylinder-shaped water separating screen adapted to separate water contained in the liquid medium from the liquid medium;

a particle filter of a hydrophilic fiber material and having a greater pore size than the annular filter medium of the filter element, the particle filter arranged at the lower end of the cup-shaped outlet member, the particle filter is star-folded and arranged on a radially inner face of the screen element, the particle filter attached to the screen element and resting on the closed bottom of the screen element;

a central tube arranged within a radial interior of the particle filter, resting directly on a radially inner face of the particle filter, the central tube extending from a lower axial end of the particle filter on the closed bottom up to an upper axial end of the particle filter such that the central tube supports the particle filter over its axial length;

wherein the particle filter has a radially outer side that is arranged on the screen element such that the particle filter is sandwiched between the central tube and the screen element;

wherein the radially outwardly extending flange of the cylinder-shaped water separating screen rests directly on an axially outer face of the upper end plate;

a clean chamber arranged at the radially inner side of the central tube, in communication with the cup-shaped outlet member, and closed at a lower end of the clean chamber by the closed bottom of the screen element, the clean chamber arranged in the flow direction of the liquid medium downstream of the filter medium and downstream of the particle filter; and wherein the assembly unit is configured for installation as a unit into an interior of the annular filter medium;

wherein the filter system further comprises:

a separating chamber arranged between the coalescing element and a radially outer side of the assembly unit and having a water outlet opening fluidically connect the separating chamber to the water collecting chamber of the filter housings.

* * * * *